US 10,895,986 B2

(12) United States Patent
Yoshida et al.

(10) Patent No.: US 10,895,986 B2
(45) Date of Patent: Jan. 19, 2021

(54) CONTROL APPARATUS AND NON-TRANSITORY RECORDING MEDIUM HAVING STORED THEREIN CONTROL PROGRAM

(71) Applicant: FUJITSU LIMITED, Kawasaki (JP)

(72) Inventors: Masahiro Yoshida, Kawasaki (JP); Tomohiko Muroyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 16/524,236

(22) Filed: Jul. 29, 2019

(65) Prior Publication Data

US 2020/0065004 A1 Feb. 27, 2020

(30) Foreign Application Priority Data

Aug. 23, 2018 (JP) ................................ 2018-156298

(51) Int. Cl.
*G06F 3/06* (2006.01)
*G06F 11/14* (2006.01)

(52) U.S. Cl.
CPC ........ *G06F 3/0607* (2013.01); *G06F 11/1456* (2013.01); *G06F 11/1466* (2013.01)

(58) Field of Classification Search
None
See application file for complete search history.

(56) References Cited

U.S. PATENT DOCUMENTS

| 5,502,822 A * | 3/1996 | Takebe .................... G06F 5/16 710/316 |
| 5,555,389 A | 9/1996 | Satoh et al. |
| 2002/0099768 A1* | 7/2002 | Wright .................... G06F 9/544 709/203 |
| 2003/0177233 A1* | 9/2003 | Quiggle .............. H04L 12/6418 709/225 |
| 2019/0361620 A1* | 11/2019 | Sasamoto ............. G06F 3/0659 |

FOREIGN PATENT DOCUMENTS

| JP | 01-112452 | 5/1989 |
| JP | 07-072981 | 3/1995 |

* cited by examiner

*Primary Examiner* — Kevin Verbrugge
(74) *Attorney, Agent, or Firm* — Fujitsu Patent Center

(57) ABSTRACT

A control apparatus includes first and second regions that each store device information of a monitoring target device; an evacuating region; and a processor configured to execute a procedure including: controlling switching between first and second states at a predetermined timing, the first state including the first region being in updatable and unreferenceable states and the second region being in referenceable and unupdatable states, the second state including opposite states to the first state; evacuating, in a case where the second region is being referred at a timing when the first state is switched to the second state, unreferred information stored in the second region to the evacuating region; controlling, after completion of evacuation, switching the state of the second region from referenceable to updatable; and controlling, after completion of reference to the unreferred information in the evacuating region, switching the state of the first region from updatable to referenceable.

12 Claims, 19 Drawing Sheets

FIG. 5

COLLECTING PATTERN TABLE ~24b

| No. | INFORMATION A | INFORMATION B | INFORMATION C | INFORMATION D | INFORMATION E | ... |
|---|---|---|---|---|---|---|
| 1 | On | Off | On | Off | | ... |
| 2 | On | On | On | | On | ... |
| 3 | On | On | On | Off | | ... |

FIG. 6

MANAGEMENT TABLE 24c

| No. | COUNT | INTERVAL | LATEST COLLECTING TIME |
|---|---|---|---|
| 1 | 220 | 30 | 2017/08/23 17:40:00 |
| 2 | 1 | — | 2017/08/16 10:00:21 |
| 3 | 10 | 600 | 2017/08/23 16:59:59 |
| 4 | — | — | — |
| .. | .. | .. | .. |

FIG. 7

EVACUATING REGION TABLE  ~24d

| INFORMATION A | INFORMATION B | INFORMATION C | INFORMATION D | INFORMATION E |
|---|---|---|---|---|
| On | Off | Off | On | Off |
| ... | ... | ... | ... | ... |

FIG. 14

MANAGEMENT TABLE ~24c

| No. | COUNT | INTERVAL | LATEST COLLECTING TIME |
|---|---|---|---|
| 1 | 221 | 30 | 2017/08/23 17:40:30 |
| 2 | 1 | — | 2017/08/16 10:00:21 |
| 3 | 10 | 600 | 2017/08/23 16:59:59 |
| 4 | — | — | — |
| ⋮ | ⋮ | ⋮ | ⋮ |

UPDATE NO. 1

COLLECTING PATTERN TABLE ~24b

| No. | INFORMATION A | INFORMATION B | INFORMATION C | INFORMATION D | INFORMATION E | ⋯ |
|---|---|---|---|---|---|---|
| 1 | On | Off | On | Off | Off | ⋯ |
| 2 | On | On | On | On | On | ⋯ |
| 3 | On | Off | On | Off | Off | ⋯ |

EXAMPLE OF A CASE WHERE INFORMATION IS COLLECTED ON DATA PATTERN NO. 1

FIG. 15

MANAGEMENT TABLE 24c

| No. | COUNT | INTERVAL | LATEST COLLECTING TIME |
|-----|-------|----------|------------------------|
| 1 | 221 | 30 | 2017/08/23 17:40:30 |
| 2 | 1 | – | 2017/08/16 10:00:21 |
| 3 | 10 | 600 | 2017/08/23 16:59:59 |
| 4 | 1 | – | 2017/08/23 17:40:45 |
| 5 | – | – | – |
| .. | .. | .. | .. |

COLLECTING PATTERN TABLE 24b

| No. | INFORMATION A | INFORMATION B | INFORMATION C | INFORMATION D | INFORMATION E | ... |
|-----|---------------|---------------|---------------|---------------|---------------|-----|
| 1 | On | Off | On | Off | Off | ... |
| 2 | On | On | On | On | On | ... |
| 3 | On | Off | On | Off | Off | ... |
| 4 | On | Off | Off | On | On | ... |

EXAMPLE OF A CASE WHERE INFORMATION IS COLLECTED ON NEW DATA PATTERN

FIG. 17

MANAGEMENT TABLE ~24c

| No. | COUNT | INTERVAL | LATEST COLLECTING TIME |
|---|---|---|---|
| 1 | 220 | 30 | 2017/08/23 17:40:00 |
| 2 | 1 | — | 2017/08/16 10:00:21 |
| 3 | 10 | 600 | 2017/08/23 16:59:59 |
| 4 | — | — | — |
| ⋮ | ⋮ | ⋮ | ⋮ |

COLLECTING PATTERN TABLE ~24b

| No. | INFORMATION A | INFORMATION B | INFORMATION C | INFORMATION D | INFORMATION E |
|---|---|---|---|---|---|
| 1 | On | Off | Off | On | Off |
| 2 | On | On | On | On | On |
| 3 | On | Off | On | On | Off |
| ⋮ | ⋮ | ⋮ | ⋮ | ⋮ | ⋮ |

COLLECTING NO. 1 IS EXECUTED ON 2017/08/23 17:40:30 AND COLLECTING INFORMATION A IS COMPLETED

EXAMPLE OF MANAGEMENT INFORMATION WHEN PROCESS OF EVACUATING IS EXECUTED

CONTROL APPARATUS AND NON-TRANSITORY RECORDING MEDIUM HAVING STORED THEREIN CONTROL PROGRAM

CROSS-REFERENCE TO RELATED APPLICATION

This application is based upon and claims the benefit of priority of the prior Japanese Patent Application No. 2018-156298, filed on Aug. 23, 2018, the entire contents of which are incorporated herein by reference.

FIELD

The embodiment discussed herein relates to a control apparatus and a non-transitory recording medium having stored therein a control program.

BACKGROUND

Recent spreading broadband communication and development of the Information and Communication Technology (ICT) technique increase various unstructured data.

In some cases, such various types of unstructured data are managed by a control apparatus that controls a monitoring target device, such as a storage control apparatus that controls a storage apparatus. Example of the unstructured data managed by a storage control apparatus are apparatus information related to the performance of a storage apparatus and information related to the device configuration of the storage apparatus.

In a storage apparatus, types of server to access the storage apparatus and types of software (SW) to control the access and system operation have come to increase.

To enhance the interoperability in a heterogeneous system of a storage apparatus, a technique has been known which sets and manages the storage apparatus by, for example, storage management client software executed by the server. Hereinafter, storage management client software is referred to as "system operation SW".

Patent Document 1: Japanese Laid-open Patent Publication No. 07-72981

Patent Document 2: Japanese Laid-open Patent Publication No. 01-112452

In executing and controlling various processes, the system operation SW sometimes obtains (refers to) the apparatus information of a storage control apparatus in order to optimize the system operation. Obtainment of the apparatus information may sometimes affect (hinder) the operation of the storage control apparatus.

For example, in a storage apparatus, operation of collecting (referring to) apparatus information of a storage apparatus by the system operation SW sometimes interferes with operation of updating the apparatus information of the storage apparatus. One of the reasons for such interference is that increase of various types of unstructured data increases the data size of the apparatus information to be collected or updated, so that operation of collecting and updating the apparatus information takes longer time.

SUMMARY

According to an aspect of the embodiments, a control apparatus may include: a processor; a first storing region and a second storing region that store device information of a monitoring target device; and an evacuating region that stores at least part of the device information, wherein the processor is configured to execute a procedure, the procedure including: controlling switching between a first state and a second state at a predetermined timing, the first state including the first storing region being in an updatable state representing that the device information stored therein is unable to be referred from a monitoring device and is able to be updated by the monitoring device, and the second storing region being in a referenceable state representing that the device information stored therein is able to be referred by the monitoring device and is unable to be updated by the monitoring device, the second state including the first storing region being in the referenceable state and the second storing region being in the updatable state; evacuating, in a case where the second storing region is being referred from the monitoring device at a timing when the first state is switched to the second state, unreferred device information which is unreferred from the monitoring device among the device information stored in the second storing region to the evacuating region; controlling, after completion of evacuation of the unreferred device information to the evacuating region, switching the second storing region from the referenceable state to the updatable state; and controlling, after completion of reference to the unreferred device information in the evacuating region by the monitoring device, switching the first storing region from updatable state to the referenceable state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a collecting pattern table;

FIG. 6 is a diagram illustrating an example of a management table;

FIG. 7 is a diagram illustrating an example of an evacuating region table;

FIG. 14 is a diagram illustrating an example of a manner of updating management information;

FIG. 15 is a diagram illustrating another example of a manner of updating management information;

FIG. 17 is a diagram illustrating an example of managing information when a process of evacuating is carried out;

DESCRIPTION OF EMBODIMENTS

Hereinafter, an embodiment of the present invention will now be detailed with reference to accompanying drawings. The following embodiment is exemplary and there is no intention to exclude various modifications and applications of techniques not explicitly referred in the first embodiment. In other words, various changes and modifications can be suggested without departing from the scope of the first embodiment. Throughout the drawings, like reference numbers designate the same or substantially same parts and elements unless otherwise specified.

<<1>> Embodiment

Figure 1:
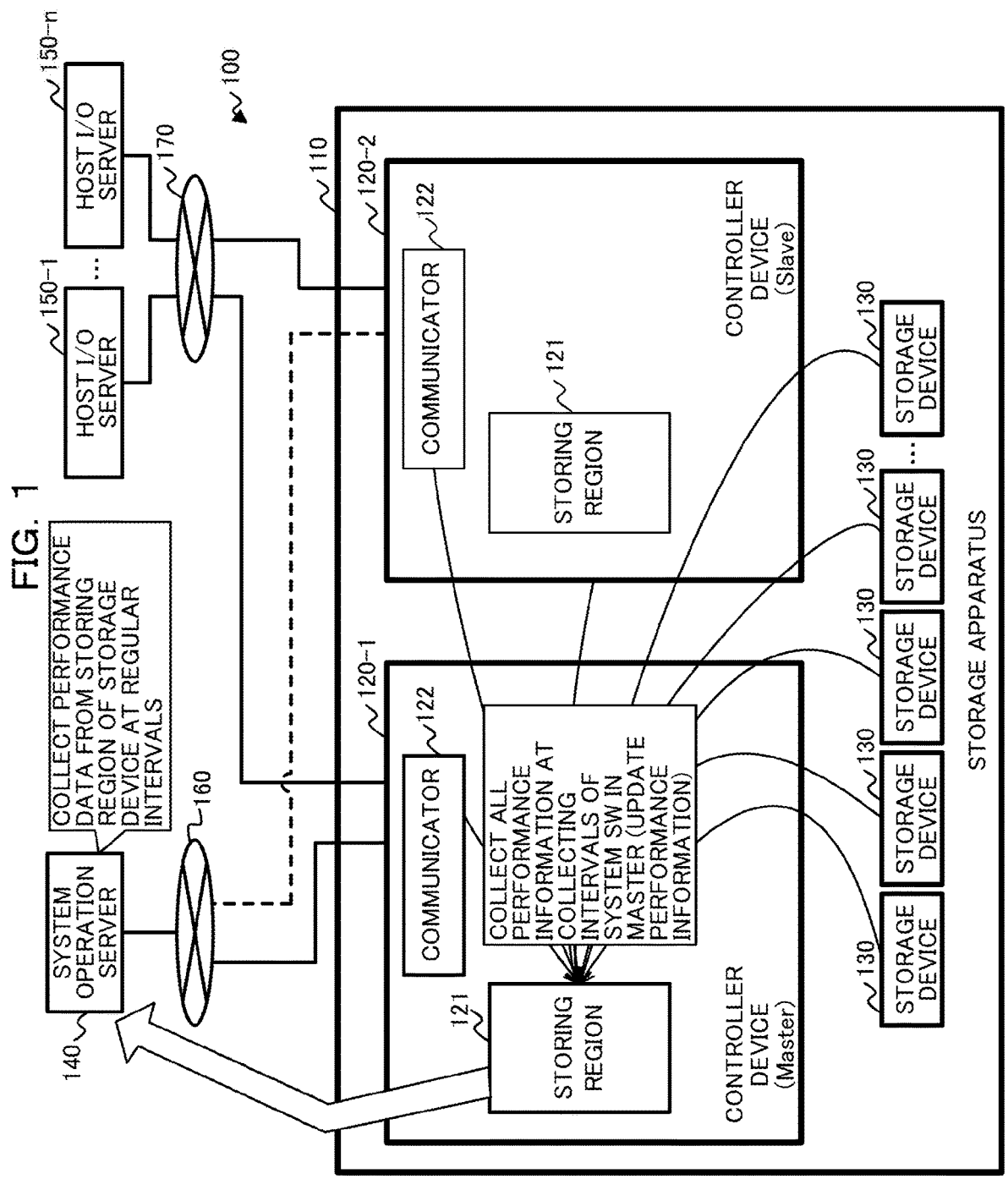
FIG. 1 is a block diagram schematically illustrating the configuration of a storage system according to a comparative example.

<<1-1>> Comparative Example:

FIG. 1 is a block diagram schematically illustrating an example of the configuration of a storage system 100 according to a comparative example. As illustrated in FIG. 1, the storage system 100 exemplarily includes a storage apparatus 110, a system operation server 140, and multiple (in the example of FIG. 1, (n; n is an integer of 2 or more in FIG. 1) host I/O servers 150-1 to 150-n. Hereinafter, when not being discriminated from one another, the host I/O servers 150-1 to 150-n are referred simply to as host I/O servers 150.

FIG. 1 exemplarily illustrates a block diagram in which functional blocks related to a process of referring to performance information serving as an example of device information and a process of updating the performance information, omitting functional blocks related to other operation of the storage system 100.

In the system operation server 140, system operation SW is installed and thereby may be bidirectionally-communicably connected to the storage apparatus 110 via a network 160 such as a Local Area Network (LAN). In a system operation server 140, multiple pieces of system operation SW may be executed. Alternatively, the storage system 100 may include multiple system operation servers 140.

Each host I/O server 150 is bidirectionally-communicably connected to the storage apparatus 110 via a network 170, and may make an I/O access to a storing region that the storage apparatus 110 provides. The network 170 may include an interconnection (switching fabric connection) including a switch conforming to a standard such as a LAN, a Storage Area Network (SAN), and an InfiniBand.

As illustrated in FIG. 1, the storage apparatus 110 may include multiple (two in the example of FIG. 1) controller devices 120-1 and 120-2, and multiple storage devices 130 each having a storing region. Hereinafter, when not being discriminated from one another, the controller devices 120-1 and 120-2 are referred simply to as controller devices 120.

The controller device 120 may control an I/O access to a storing region of each storage device 130 in accordance with a host I/O. For example, the controller device 120 may include a storing region 121 that stores performance information and a communicator 122 that controls communication with the system operation server 140 and the host I/O servers 150.

The controller device 120 may have an attribute of a master or a slave. In the example of FIG. 1, the controller device 120-1 functions as a master, and the controller device 120-2 functions as a slave. The operation of the controller device 120 to be described below is assumed to be carried out by the master controller device 120-1.

The controller (not illustrated) of the controller device 120 collects data of performance information from the storage devices 130, the communicator 122, the slave controller device 120 at regular intervals, and updates the performance information stored in the 121 (process of updating). The controller refers to and display data of various performance information of the controller device 120 by referring to the storing region 121 in response to a request from the system operation server 140 (process of referring).

The controller updates the performance information by activating the process of updating at regular intervals, so that the storage apparatus 110 solely can control referring to and displaying data without any problem.

It is important for detecting processing delay and detecting and controlling load distribution of an amount of processing in the system operation to collect (refer to) the performance data of the controller device 120 from the system operation server 140 external to the controller device 120. For this purpose, the system operation server 140 collects (refers to) the performance information of the storage apparatus 110 and then manages the operation on the basis of the collected performance information.

In recent years, data types and a data amount of performance information to be collected in the storage apparatus 110 are increasing. This is because, for example, the types of performance data to be monitored is increasing due to implementing advanced functions to the controller device 120 and enlargement of the scale of the controller device 120 simply increases the data amount.

As illustrated in FIG. 1, the storing region 121 of the storage apparatus 110 stores data of one generation. In cases where it takes a short time to update data in the storage apparatus 110 and collect data by the system operation server 140 or the intervals of collecting and updating data are long, storing performance information of one generation has a low possibility of arising a problem.

However, in cases where the intervals of collecting data of the system operation server 140 are unchanged while the amount of data of the storage apparatus 110 increases, there is a possibility of a conflict between updating data in the storage apparatus 110 and collecting data of the system operation server 140. In the event of a conflict, data for which referring is competing with updating may have difficulty in being ensured and may be delayed in being updated due to waiting for reference.

In cases where the monitoring is carried out by multiple pieces of system operation SW, the data to be collected is not fixed and the intervals of collecting are not uniform, so that the possibility of generating a conflict rises.

A process of collecting data of the performance information by the system operation server 140 may restrict the time for carrying out the process of collecting, so that restriction to immediate efficiency may be set. In this case, it is difficult for the storage apparatus 110 to control the system operation server 140 in collecting data of the performance information and in activating of updating.

In the following embodiment, description will be made in relation to a manner of obtaining correct device information without disagreement of operation of updating data in the storage apparatus 110 from operation of collecting data in the system operation server 140.

Figure 2:
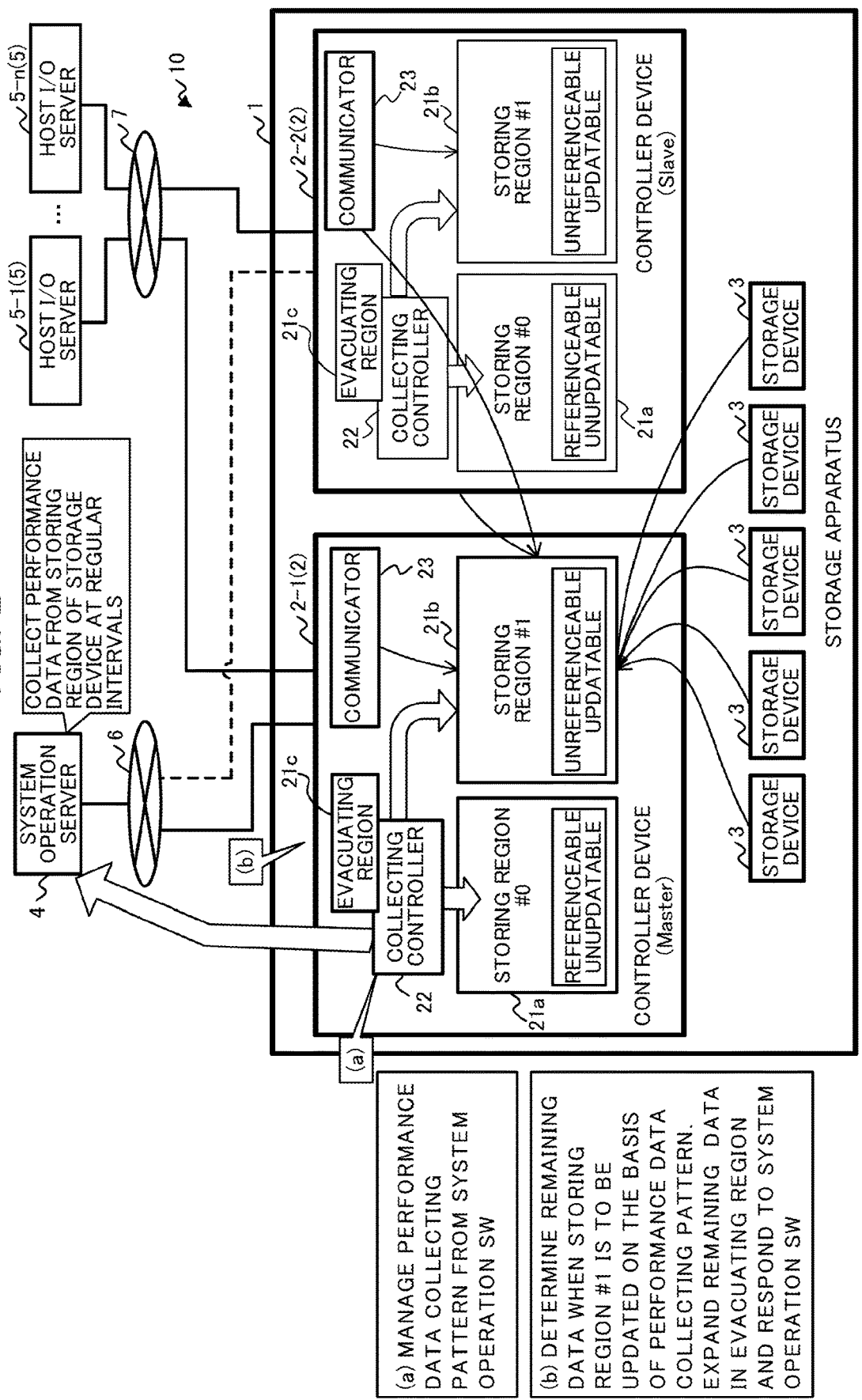
FIG. 2 is a block diagram schematically illustrating an example of the configuration of a storage system of an embodiment.

<<1-2>> Example of Configuration of a Storage System of an Embodiment:

FIG. 2 is a block diagram schematically illustrating an example of the configuration of a storage system 10 according to an embodiment. As illustrated in FIG. 2, the storage system 10 according to this embodiment exemplarily includes a storage apparatus 1, one or more system operation servers 4, and multiple (n in the example of FIG. 2) host I/O servers 5-1 to 5-*n*. Hereinafter, when not being discriminated from one another, the host I/O servers 5-1 to 5-*n* are referred simply to as host I/O servers 5. FIG. 2 exemplarily illustrates a block diagram focusing on functional blocks related to a process of referring to performance information serving as an example of device information and a process of updating the performance information, and omitting functional blocks related to other operation of the storage system 10.

The system operation server 4 is an example of a monitoring device and an information processing apparatus. In the system operation server 4, system operation SW is installed and thereby may be bidirectionally-communicably connected to the storage apparatus 1 via a network 6 such as a LAN. In a system operation server 4, multiple pieces of system operation SW may be executed. Alternatively, the storage system 10 may include multiple system operation servers 4.

Each host I/O server 5 is an example of an information processing apparatus, may be bidirectionally-communicably connected to the storage apparatus 1 via a network 7, and may make an I/O access to a storing region that the storage apparatus 1 provides. The network 7 may include an interconnection (switching fabric connection) including a switch conforming to a standard such as a LAN, a SAN, and an InfiniBand.

The storage apparatus 1 is an example of a monitoring target apparatus, and provides a storing region to the host I/O servers 5. An example of the storage apparatus 1 is Software Defined Storage. The storage apparatus 1 may include multiple (two in the example of FIG. 2) controller devices 2-1 and 2-2, and multiple storage devices 3 each including a storing region. Hereinafter, when not discriminating from each other, the controller devices 2-1 and 2-2 are simply referred to as the controller devices 2. The storage apparatus 1 (controller device 2) may be connected to multiple storage devices 3 via, for example, a SAN or a network (not illustrated) such as switching fabric connection.

A storage device 3 is an example of a storing device having a storing region. Example of a storage device 3 is a magnetic disk device such as a Hard Disk Drive (HDD), a semiconductor drive apparatus such as a Solid State Drive (SSD), and a non-volatile memory. Examples of a non-volatile memory is a flash memory, a Storage Class Memory (SCM), and a Read Only Memory (ROM). The multiple storage devices 3 may constitute a disk array such as Redundant Arrays of Inexpensive Disks (RAID).

A controller device (storage controller device) 2 is an example of a control apparatus that controls the storage apparatus 1, which is an example of a monitoring target apparatus, and may control an I/O access to the storing region of a storage device 3 in obedience to a host I/O. An example of the controller device 2 is a controller such as a Controller Module (CM).

The controller device 2 may include multiple (two in the example of FIG. 2) storing regions 21*a* and 21*b* that store performance information, an evacuating region 21*c*, a collecting controller 22, and a communicator 23.

The controller device 2 may have an attribute of a master or a slave. In the example of FIG. 2, the controller device 2-1 functions as a master, and the controller device 2-2 functions as a slave. The following description related to the operation of the controller device 2 is assumed to be performed by the controller device 2-1 serving as the master. Here, the slave controller device 2 is promoted to a master in cases where a failure occurs in the master, which consequently comes to be inoperable, and functions as a master until inoperable controller device 2 restores. For this purpose, the slave controller device 2-2 may have the same functional configuration as the master controller device 2.

The collecting controller 22 manages the generations of the storing regions 21*a* and 21*b* that stores the performance information in the storage apparatus 1, and controls the storing regions 21*a* and 21*b* that the system operation server 4 refers to for collecting information.

The performance information is an example of device information related to the storage apparatus 1. The performance information may be managed in a Database (DB), a table, and an array in the storing regions 21*a* and 21*b*. The performance information may be used to be presented as information to be used for performance analysis of the storage system 10 (storage apparatus 1) to the user, and for monitoring the performance of the storage system 10 (storage apparatus 1).

The performance information may include the information related to various element types of a storage device 3, a volume and a pool consisting of the storage devices 3, the communicator 23, the processor of the controller device 2. Examples of the performance are information related to, for example, reading, writing, reading and writing, a cache, a processor performance, and temperature. The performance information may be used for management of operation in the system operation server 4, such as detection of processing delay, detection of load distribution of a processing amount, and control.

The communicator 23 controls communication with the system operation server 4 and with the host I/O servers 5. The communicator 23 may be provided with an adaptor, such as a Channel Adaptor (CA) that conforming to a standard such as Ethernet (registered trademark), Fiber Channel (FC), or an InfiniBand.

<<1-2-1>> Controller Device:

The controller device 2 of this embodiment may collect data of performance information from the storage devices 3, the communicator 23, and the slave controller device 2 at regular intervals, and control updating of the data of the performance information stored in either one of the storing region 21*a* and 21*b* (process of updating). Hereinafter, the data of performance information is sometimes referred to "performance data".

The collecting controller 22 of this embodiment may control referring to and displaying various performance data by the controller device 2 in response to a request from the system operation server 4 (process of referring) by referring to either one of the restoring region 21a and 21b.

The collecting controller 22 updates the performance information by activating the process of updating at regular intervals. For this purpose, the collecting controller 22 controls switching a updating target to be updated alternately between the storing regions 21a and 21b each time of the updating.

Besides, the collecting controller 22 controls switching a collecting target from which the system operation server 4 collects the performance information alternately between the storing regions 21a and 21b concurrently at the same regular intervals of the process of updating by the system operation server 4.

For example, the collecting controller 22 can exclusively switches the updating target and the collecting target between the storing regions 21a and 21b by alternately setting the following state 1 and state 2 at each cycle of updating and referring.

State 1 (N-th period (timing) of updating and referring, where N is an integer of 1 or more)
storing region 21a: updatable and unreferenceable (updatable state)
storing region 21b: unupdatable and referenceable (referenceable state)

State 2 ((N+1)-th period (timing) of updating and referring)
storing region 21a: unupdatable and referenceable (referenceable state)
storing region 21b: updatable and unreferenceable (updatable state)

The terms "referenceable" and "unreferenceable" represent whether the system operation server 4 or the system operation SW is allowed to refer to the device information, and the terms "updatable" and "unupdatable" represent whether the storage apparatus 1 is allowed to update the device information.

As exemplarily represented by the state 1 and the state 2, each of the storing regions 21a and 21b are set exclusively to be updatable or referenceable under the referenceable state or the updatable state. In addition, the updatable state and the referenceable state are exclusively set between the storing regions 21a and 21b.

As the above, the controller device 2 can exclude a conflict between the process of referring (collecting) and the process of updating that are performed at regular intervals by switching between the storing regions 21a and 21b.

Depending on a status of referring to and updating the storing regions 21a and 21b, the storing regions 21a and 21b sometimes both come into a state of unreferenceable or unupdatable.

Here, in cases where the above exclusive control may cause a conflict, the controller device 2 may evacuate appropriate data from the storing region 21a or 21b to the evacuating region 21c.

An example of a case where a conflict is generated is a case where, at the timing of switching the storing region 21a or 21b the referenceable state to the updatable state, the storing regions 21a and 21b is still being referred by the system operation server 4.

The controller device 2 may evacuate performance data (i.e., currently unreferred) being stored in the storing region 21a or 21b to be switched to the updatable state and being to be referred by the system operation server 4 to the evacuating region 21c. In this event, the controller device 2 can early cancel (i.e., shift into an unreferred state) the state of being referred of the storing region 21a or 21b to be switched to the updatable state by switching the referring destination by the system operation server 4 to the evacuating region 21c.

As an example, the controller device 2 may manage (e.g., learn) a collecting pattern of performance data by the system operation server 4, as illustrated in the markup (a) of FIG. 2.

Then, the controller device 2 determines the remaining data when the storing region 21b (represented by "STORING REGION #1") is updated on the basis of the collecting pattern, expands the remaining data in the evacuating region 21c, and respond to the system operation server 4, as illustrated in the markup (b).

In the above manner, the controller device 2 can select appropriate data based on the collecting pattern managed therein as data to be evacuated to the evacuating region 21c. Evacuation such appropriate data to the evacuating region 21c can avoid a conflict between the process of referring and the process of updating, so that the correctness (consistency) of the performance data to be collected by the system operation server 4 can be ensured.

As the above, the controller device 2 causes the collecting controller 22 to execute the process of updating for collecting, calculating, and storing various types of performance data. Consequently, the process of updating can be accomplished, reducing the influence on the I/O control of the storage apparatus 1.

The controller device 2 according to this embodiment includes the storing regions 21a and 21b each storing performance data of two generations for collecting the performance data by the system operation server 4 in the process of updating the performance data in the storage apparatus 1.

Providing the storing region of data of more than two generations can more easily accomplish mutual exclusion, but unnecessarily gains the resource of the controller device 2. Therefore, each storing region preferably retains a capacity of the minimum generations. Assuming that a region for one generation is provided, collecting of data by the system operation server 4 and updating of data in the storage apparatus 1 cause a conflict and exclusion, which generates inconvenience in the viewpoints of delay in collecting data and ensuring the correctness of data. As a solution to the above, this embodiment restrict the number of generations to be retained in each of the storing regions 21a and 21b to two generations.

Figure 3:
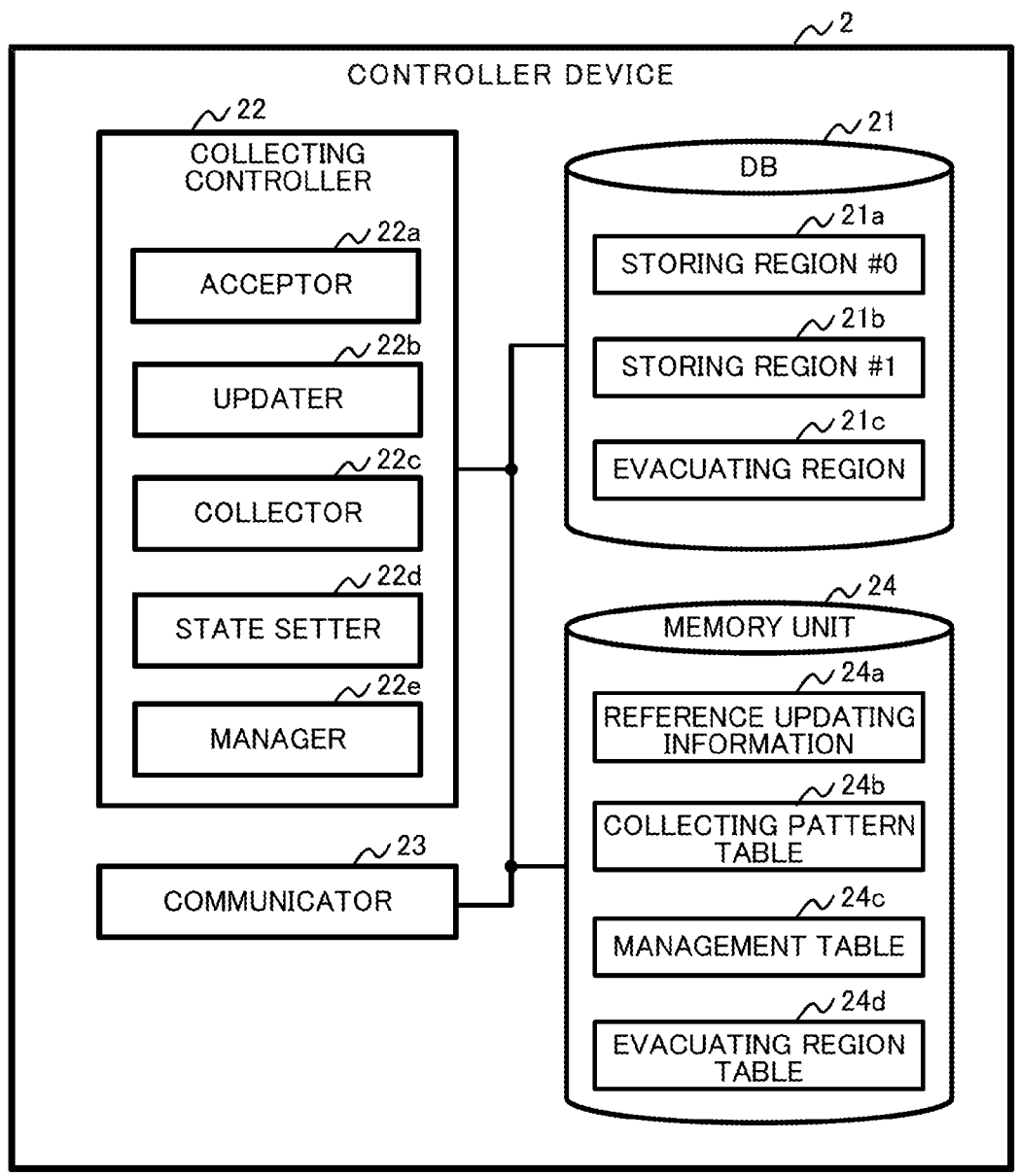
FIG. 3 is a block diagram schematically illustrating an example of a functional configuration of a controller device according to an embodiment.

<<1-2-2>> Example of Configuration of Controller Device:

Next, description will now be made in relation to an example of functional configuration of the controller device 2 according to this embodiment with reference to FIG. 3. As illustrated in FIG. 3, the controller device 2 may exemplarily include a DB 21, a collecting controller 22, the communicator 23 described above, and a memory unit 24.

The DB 21 is an example of a repository and may be a database management system such as PostgreSQL. The DB 21 may include the storing region 21a (first storing region) and the storing region 21b (second storing region) that each store performance information serving as one example of device information related to the storage apparatus 1, and the evacuating region 21c that can store at least part of the performance information. Furthermore, the DB 21 may store various management information used for managing of the storage apparatus 1.

The DB 21 may be achieved by a storing region of a storing device exemplified by a magnetic disk apparatus such as a HDD, a semiconductor drive apparatus such as an SSD, and a non-volatile memory.

The collecting controller 22 may exemplarily include an acceptor 22a, an updater 22b, a collector 22c, a state setter 22d, and a manager 22e.

The acceptor 22a may receive a collecting request (command) for collecting performance information from the system operation server 4, and cause the updater 22b or the collector 22c to carry out its process on the basis of the referenceable or unreferenceable state of the storing regions 21a and 21b.

The updater 22b may collect performance data from each device included in the storage apparatus 1, and update the performance data stored in the storing region 21a or 21b being in a updatable state using the collected data.

The updater 22b is an example of an evacuating processor that executes the following process in cases where the storing region (e.g., the storing region 21b) that is to be switched into the updatable state is being referred by the system operation server 4 at the timing of switching the states of the storing regions 21a and 21b. For example, the updater 22b serving as one example of the evacuating processor may evacuate unreferred performance information which has not been referred yet among the device information stored in the storing region 21b to the evacuating region 21c.

The collector 22c may collect the data to be collected in response to the collecting request accepted by the acceptor 22a from the performance information stored in the storing device 21a or 21b being in the referenceable state and respond to the system operation server 4 with the collected data through the acceptor 22a.

In cases where the data to be collected in response to the collecting request is stored in the evacuating region 21c, the collector 22c may respond to the system operation server 4 with the evacuated data stored in the evacuating region 21c.

The state setter 22d serving an example of a switching controller may set the respective states of the storing regions 21a and 21b on the basis of the states of operating respective processes performed by the updater 22b and the collector 22c.

For example, the state setter 22d carries out switching control that switches a first state, in which the storing region 21a is in the updatable state and the storing region 21b is in the referenceable state, and a second state, in which the storing region 21a is in the referenceable state and the storing region 21b is in the updatable state, at a predetermined timing.

The state setter 22d serving as an example of the switching controller may carry out the following process in cases where the updater 22b has performed the process of evacuating.

After completion of evacuation of unreferred performance data to the evacuating region 21c, the state setter 22d controls switching the storing region 21b from the referenceable state to the updatable state.

After completion of referring to the unreferred performance information stored in the evacuating region 21c from the system operation server 4, the state setter 22d controls switching the storing region 21a from the updatable state to the referenceable state.

The manager 22e may manage and learn the collecting pattern of the performance information of the system operation server 4 (system operation SW) on the basis of the collecting request accepted by the acceptor 22a. The collecting pattern managed by the manager 22e may be used for determining the evacuating target (unreferred data) that the collector 22c is to evacuate to the evacuating region 21c.

The memory unit 24 serving as an example of a management region may store reference updating information 24a, and information of collecting pattern table 24b, a management table 24c, and an evacuating region table 24d. The following description assumes that the information and table 24a-24d are information each in the table form, and may alternatively be information each stored in the form of an array and a database (DB).

The memory unit 24 may be achieved by a volatile memory such as a Random Access memory (RAM), or a storing region of a storing apparatus. The information of at least one of the reference updating information 24a, and the collecting pattern table 24b, the management table 24c, and the evacuating region table 24d may be stored in the DB 21.

The reference updating information 24a is information that sets whether the storing regions 21a and 21b are each updateable or referenceable and may be managed by the above state setter 22d.

Figure 4:
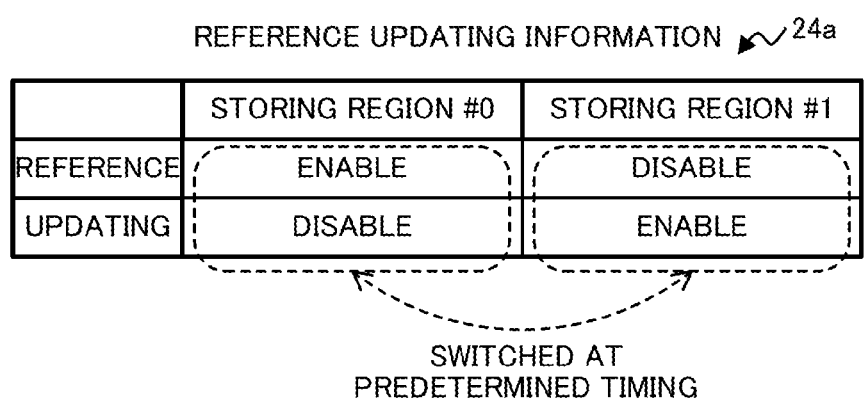
FIG. 4 is a diagram illustrating an example of reference updating information.

FIG. 4 is a diagram illustrating an example of the reference updating information 24a. As illustrated in FIG. 4, information representing whether reference is enabled or disabled and whether updating is enabled or disabled may be set for the storing region 21a represented by a reference number "#0" and the storing region 21b represented by a reference number "#1" in the reference updating information 24a. The enabling and disabling of referring to and updating for the storing regions 21a and 21b may be set to be switched at a predetermined timing by the state setter 22d.

The reference updating information 24a may be managed in the form of, for example, flags or in the form of an array or a DB as described above.

The collecting pattern table 24b is information to manage collecting patterns classified on the basis of, for example, a collecting timing of the performance information by the system operation SW and data to be collected.

Data collected from performance information is different in intervals of collecting (collecting timing) and data to be collected (combination of types of information) with the type or the function of system operation SW.

Considering the above, the manager 22e generates the collecting pattern table 24b to manage the performance data for each collecting pattern of data.

FIG. 5 is a diagram illustrated an example of the collecting pattern table 24b. As illustrated in FIG. 5, the collecting pattern table 24b exemplarily sets therein combinations of types of information assigned to be collecting targets of the respective collecting requests represented by management numbers (No. 1 to No. 3) for the respective patterns (collecting patterns) of the collecting requests. A type of information represents, for example, an element of information included in performance information, and is expressed in INFORMATION A, INFORMATION B, INFORMATION C, INFORMATION D, INFORMATION E, . . . in the example of FIG. 5. Alternatively, in the collecting pattern table 24b, the information to recognize the type or the function of system operation server 4 or system operation SW that is to collect data may be set.

The manager 22e may manage information of a collecting target assigned by a collecting request by means of an On/Off flag (or information representing "On/Off") for each management number of a pattern of collecting data. For example, the collecting pattern No. 1 means that the combination of INFORMATION A and INFORMATION D both for which "On" are set are assigned to be the collecting target.

The management table 24c is information to manage the history of collecting the performance data on a collecting pattern for each management number of the collecting pattern.

FIG. 6 is an example of the management table 24c. As exemplarily illustrated in FIG. 6, the management table 24c may set therein a management number of a collecting pattern, the number (count) of times of collecting on the collecting pattern, the time interval (interval) of collecting, the latest collecting time representing the timing of the latest collecting (access).

For example, the collecting pattern No. 1 has collected data 220 times at intervals of 30 seconds and carried out the latest collecting at the time of 17:40:00 on the day of Aug. 23, 2017.

For example, in cases where receiving a referring request to INFORMATION A and INFORMATION D (see FIG. 5) at the time of 17:40:30 on the day Aug. 23, 2017, which corresponds to the sum of the latest collecting time and the interval of 30 seconds, the manager 22e may specify that the referring request is the collecting pattern No. 1. In this case, the manager 22e may add 1 to the count and set the latest collecting time to "Aug. 23, 2017 17:40:30" in the entry of No. 1.

In cases where a collecting request that does not match any collecting pattern and/or collecting history by comparing with the collecting pattern table 24b and the management table 24c is received, the manager 22e may add a new entry to the collecting pattern table 24b and the management table 24c.

As described above, at least one of the collecting pattern table 24b and the management table 24c is an example of management information representing a referring patter of a reference access to device information by the system operation server 4.

Here, the manager 22e is an example of a pattern manager that, in cases where the system operation server 4 has carried out a reference access, updates a referring pattern or adds a new referring pattern to the management information on the basis of the executed reference access.

The evacuating region table 24d is information to manage the type of information evacuated to the evacuating region 21c by the updater 22b among the performance information stored in the storing region 21a or 21b.

FIG. 7 is an example illustrating an example of the evacuating region table 24d. As illustrated in FIG. 7, the evacuating region table 24d exemplarily sets information to determine whether or not each type of INFORMATION A, INFORMATION B, INFORMATION C, INFORMATION D, INFORMATION E, . . . of the performance information is evacuated to the evacuating region 21c.

In cases where information is evacuated to the evacuating region 21c, for example, the updater 22b may set an "On" flag (or information representing "On") to the type of the evacuated information in the evacuating region table 24d. Otherwise, in cases where the collector 22c collects information from the evacuating region 21c, the collector 22c may set an "Off" flag (or information representing "Off") to the type of information collected from the evacuating region 21c in the evacuating region table 24d.

<<1-3>> Example of Operation:

Next, description will now be made in relation to an example of operation of the storage system 10 having the above-described configuration.

Hereinafter, a storing region from which data is to be collected based on the sequence (original sequence) switched in a predetermined time period among the storing regions 21a and 21b is referred to as "collection-side storing region" or "reference-side storing region", or simply "collection side" or "reference side" as compared with a storing region for which the flag of the reference updating information 24a represents the referenceable state. Likewise, a storing region in which data is to be updated based on the sequence (original sequence) switched in a predetermined time period among the storing regions 21a and 21b is referred to as "updating-side storing region" or simply "updating side" as compared with a storing region for which the flag of the reference updating information 24a represents the updatable state.

Hereinafter, the process of updating by the updater 22b is carried out on the updating side at each predetermined time period. Besides, the process of collecting by the collector 22c is carried out on the collection side at the time when the controller device 2 receives a collecting request that the system operation SW issues at regular intervals.

<<1-3-1>> Process of Accepting a Performance Information Collecting Command:

First of all, description will now be made in relation to a process of accepting a performance information collecting command by the controller device 2 with reference to FIG. 8.

Figure 8:
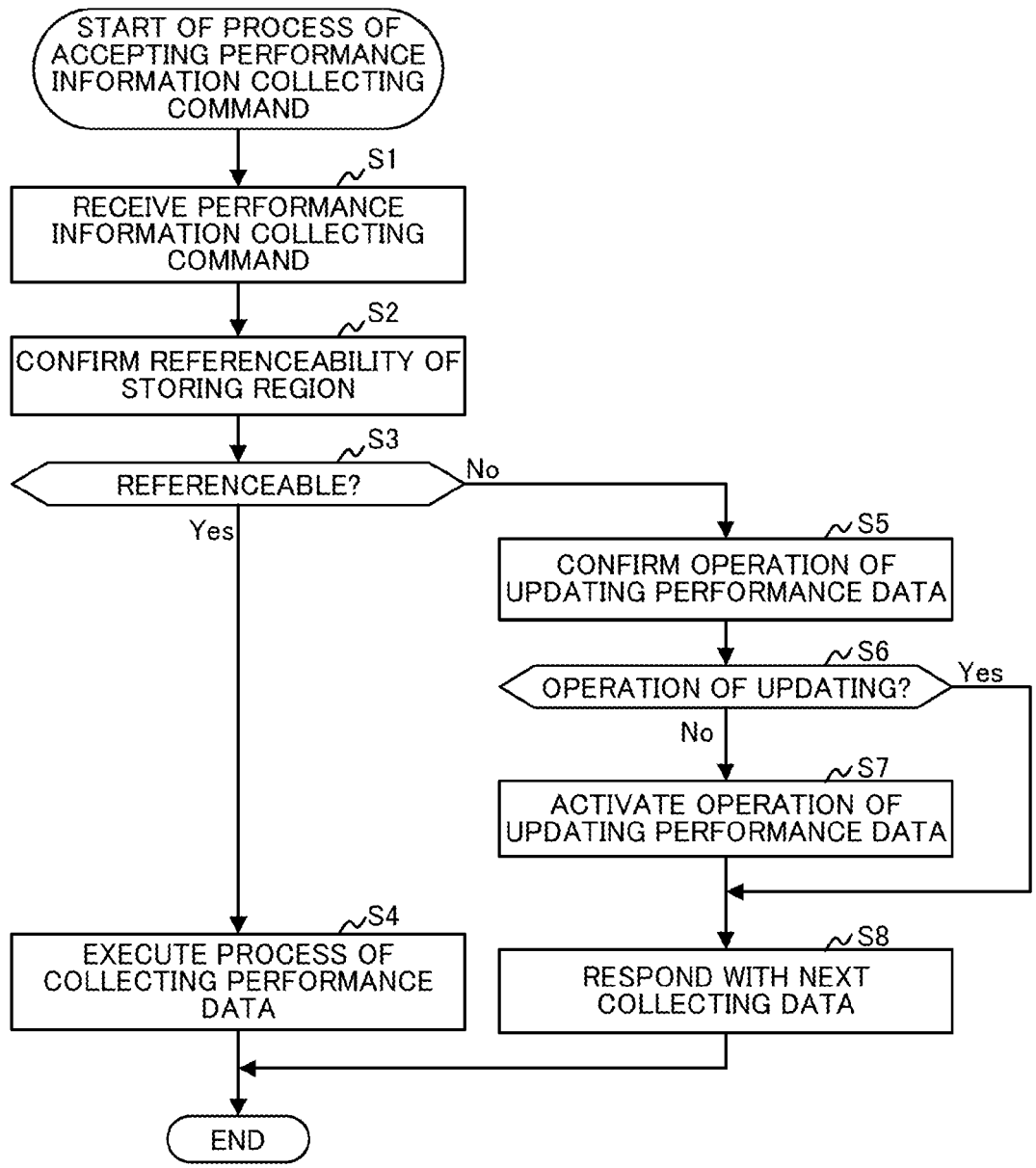
FIG. 8 is a flow diagram illustrating an example of an operation of a process of accepting a performance information collecting command according to the embodiment.

As illustrated in FIG. 8, the acceptor 22a of the reference updating information 24a receives a performance information collecting command from the system operation server 4 (Step S1).

The system operation SW in the system operation server 4 may determine whether or not the performance information stored therein is updated in the storing regions 21a and 21b at a regular timing (predetermined timing) at which the system operation SW collects (refers to) the performance information, for example. As an example, the system operation SW may confirm whether or not the performance information is updated by inquiring the reference updating information 24a of the controller device 2 in advance, and in the event of detecting updating, the system operation SW may transmit a performance information collecting command.

The acceptor 22a confirms the referenceability of each of storing regions 21a and 21b by referring to the reference updating information 24a (Step S2), and determines whether the storing region 21a or 21b is referenceable (Step S3).

In cases where the storing region 21a or 21b is referenceable (Yes in Step S3), the acceptor 22a instructs the collector 22c to carry out the process of collecting the performance data. The collector 22c executes the process of collecting performance data to be detailed below on the reference-side storing region (Step S4) and ends the process.

In cases where both the storing regions 21a and 21b are not referenceable (No in Step S3), the acceptor 22a confirms an operation of updating the performance data (Step S5) to determine whether or not the operation of updating by the updater 22b is functioning (Step S6). In cases where the operation of updating is functioning in the storing region 21a or 21b (Yes in Step S6), the process moves to Step S8.

In cases where the operation of updating is not functioning in the storing region 21a or 21b (No in Step S6), the acceptor 22a instructs updater 22b to activate an operation of updating the updating-side storing region (Step S7). Then, after the next switching between the storing regions 21a and 21b, the acceptor 22a responds to the system operation server 4 with the collected performance data from the next reference-side storing region (i.e., storing region 21a or 21b subjected to the process of updating at the current cycle) (Step S8), and ends the process.

In the No route of Step S3, the acceptor 22a may reply to the system operation SW with being waiting for the completion of updating in response to the collecting request of the current cycle.

<<1-3-2>> Process of Updating Performance Data:

Next, description will now be made in relation to an example of the operation in the process of updating performance data by the controller device 2 by referring to FIG. 9.

Figure 9:
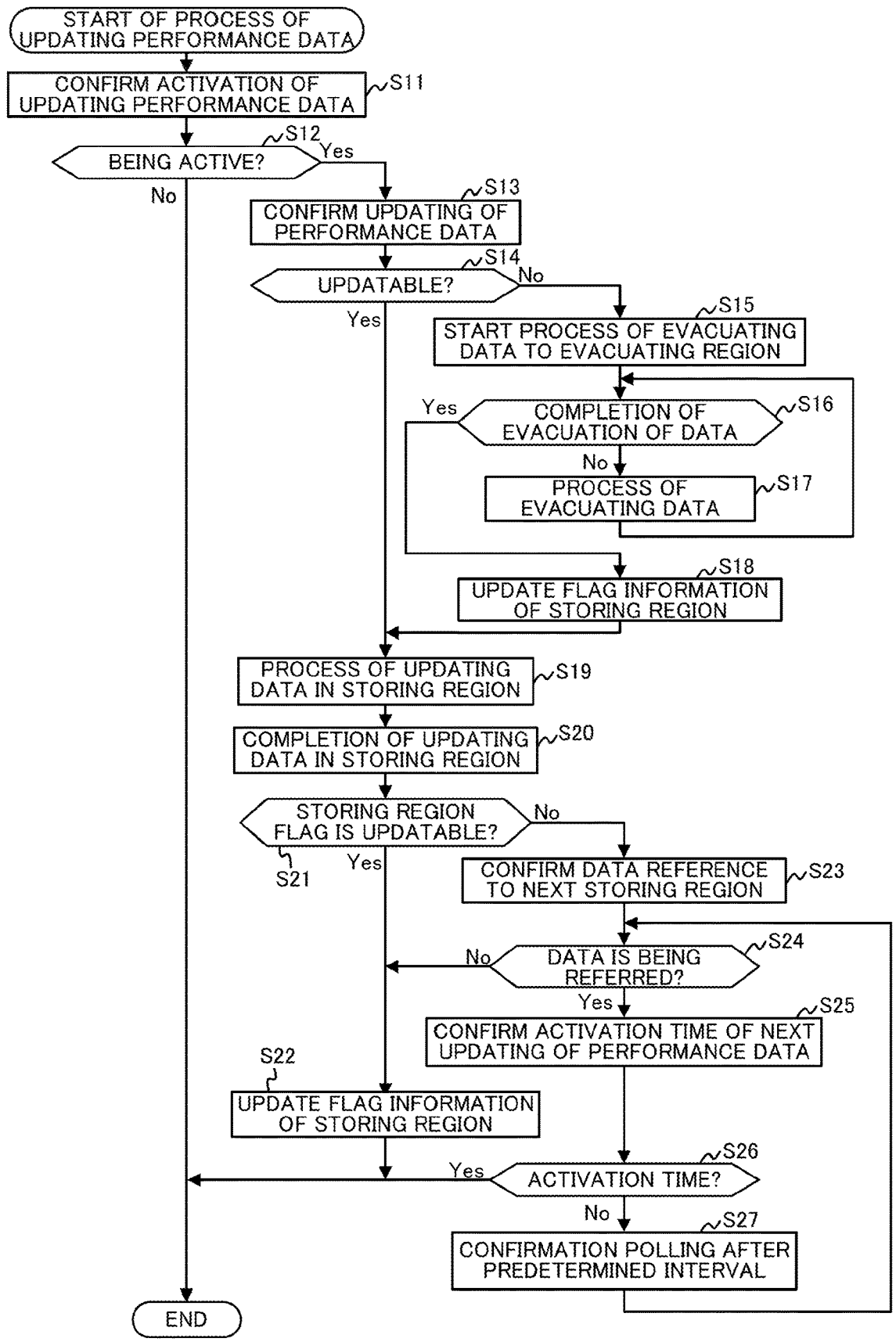
FIG. 9 is a flow diagram illustrating an example of an operation of a process of updating performance data according to the embodiment.

As illustrated in FIG. 9, the controller device 2 confirms activation of updating (Step S11) to determine whether or not the updating is being activated (Step S12). In cases where the updating is not being activated (No in Step S12), the process ends.

In contrast, in cases where the updating is being activated (Yes in Step S12), the updater 22b of the controller device 2 confirms whether the performance data is updated (Step S13) by referring to the reference updating information 24a and thereby determines whether the storing region 21a, or 21b is updatable (Step S14). In cases where the storing region 21a or 21b is updatable (Yes in Step S14), the process moves to Step S19.

If both the storing regions 21a and 21b are not updatable (No in Step S14), the updater 22b starts a process of evacuating data from the updating-side storing region currently in the referenceable state to the evacuating region 21c (Step S15).

The updater 22b determines whether or not the evacuation of data in the process of evacuating is completed (Step S16), and in cases where the evacuation is not completed yet (No in Step S16), continues the process of evacuating data (Step S17) to move the process to Step S16.

In cases where the evacuation of data is completed (Yes in Step S16), the updater 22b causes the state setter 22d to update the flag information in the reference updating information 24a (Step S18). In the updating of Step S18, the state setter 22d may set the flag information of the updating-side storing region currently being in the referenceable sate to a state of being unreferenceable and also updatable (updatable state), for example.

For the reference-side storing region, the state setter 22d may exceptionally set the flag information to a state of being unreferenceable and also unupdatable to make the storing region into the waiting state until the process of collecting from the evacuating region 21c is completed. When the process of collecting from the evacuating region 21c is completed, the state setter 22d may set the reference-side storing region into a state of being referenceable and also unupdatable (referenceable state).

Then the updater 22b carries out the process of updating data in the updating-side storing region by storing the updating data into the storing region 21a or 21b for which a flag representing unreferenceable and also updatable is set (Step S19) and thereby the updating of data in the updating-side storing region is completed (Step S20). Here, the updating data may be collected from, for example, the storage devices 3, a processor, the communicator 23, and other controller devices 2.

Next, the updater 22b determines whether or not the flag of the updating-side storing region is updatable (Step S21). In cases where the flag is updatable (Yes in Step S21), the updater 22b causes the state setter 22d to update the reference updating information 24a (Step S22) and ends the process. For example, in the updating of Step S22, the state setter 22d may set the flag information of the updating-side storing region to a state of being referenceable and also unupdatable (referenceable state) for the next cycle. Besides, the state setter 22d may set the flag information of the collection-side storing region to a state of being unreferenceable and also updatable (updatable state) for the next cycle.

As example of a case where Step S14 results in "No" is a case where execution of the process of collecting data is continued until the time interval (timing) when the updater 22b periodically updates the data has come. In this case, the system operation SW collects data of the storing region 21a or 21b that stores the old data when the referenceable flag for data storing region is to be switched due to the process of updating.

In the above case, the updater 22b temporarily postpones (waits for) switching of the referenceable flag until the evacuating of data to the evacuating region 21c is completed (see Steps S15-S17) in this embodiment. After that, the updater 22b carries out switching of the referenceable flag (see Step S18) at the timing of the completion of data evacuation (completion of execution of collecting from the storing region 21a or the 21b). Here, the reference-side storing region may be (exceptionally) set to a state of being unreferenceable and also unupdatable until collecting of the evacuated data is completed.

This makes it possible to avoid a conflict between the process of collecting and the process of updating, and to maintain the consistency of the information that the system operation SW has collected.

Referring back to FIG. 9, in cases where the flag of the updating-side storing region is not updatable (No in Step S21), the updater 22b confirms whether the system operation server 4 refers to data in the storing region 21a or 21b that comes to be the updating side in the next cycle (Step S23). The updater 22b determines whether or not the data is being referred (Step S24). In cases where the data is not being referred (No in Step S24), the process moves to step S22.

In contrast to the above, in cases where the data is being referred (Yes in Step S24), the updater 22b confirms the activation time (timing) of updating of performance data of the next cycle (Step S25), and determines whether or not the activation time has come (Step S26).

When the activation time has come (Yes in Step S26), the process ends. In contrast, when the activation time has not come (No in Step S26), the updater 22b carries out check polling after a predetermined interval (Step S27) to move the process to Step S24.

A case where Yes determination in Step S24 represents a state where the process of referring on the current reference-side storing region (the updating-side storing region of the next cycle) is not completed and is about to be caught up by the process of updating of the next cycle. In this case, the controller device 2 allows reference to the current reference-side storing region until the next collecting timing has come, and in cases where the process of referring is not completed when the next collecting timing has come, satisfactorily carries out the process of the No route of Step S14.

<<1-3-3>> Process of Updating Polling of Performance Data:

Next, description will now be made in relation to an example of operation of the process of updating polling of the performance data by the controller device 2 by referring to FIG. 10.

Figure 10:
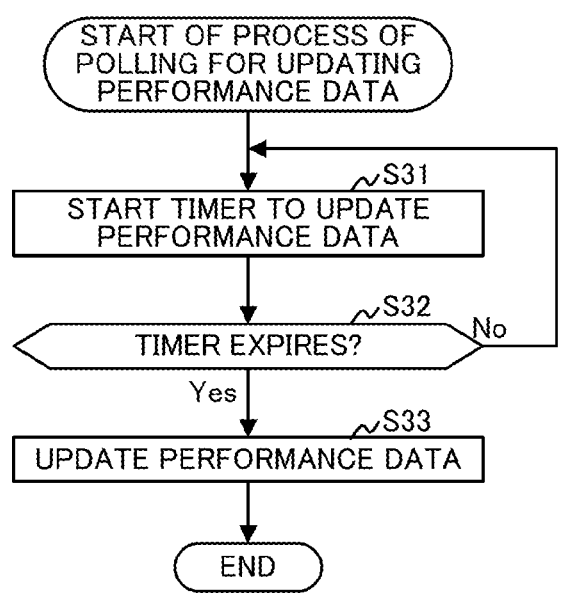
FIG. 10 is a flow diagram illustrating an example of an operation of a process of updating polling of performance data according to the embodiment.

As illustrated in FIG. 10, the controller device 2 starts a timer to update performance data (Step S31), and waits for expiration of the timer (Step S32, No in Step S32). The time counts a time interval of executing the process of updating, for example. The controller device 2 may determine that the timer expires when the time period corresponding to the interval of executing the process of updating has passed.

When the timer expires (Yes in Step S32), the controller device 2 causes the updater 22b to execute the process of updating the performance data (see FIG. 9) (Step S33) and ends the process.

<<1-3-4>> Process of Collecting Performance Data:

Next, description will now be made in relation to an example of operation of a process of collecting performance data executed in Step S4 of FIG. 8 by referring to FIG. 11.

Figure 11:
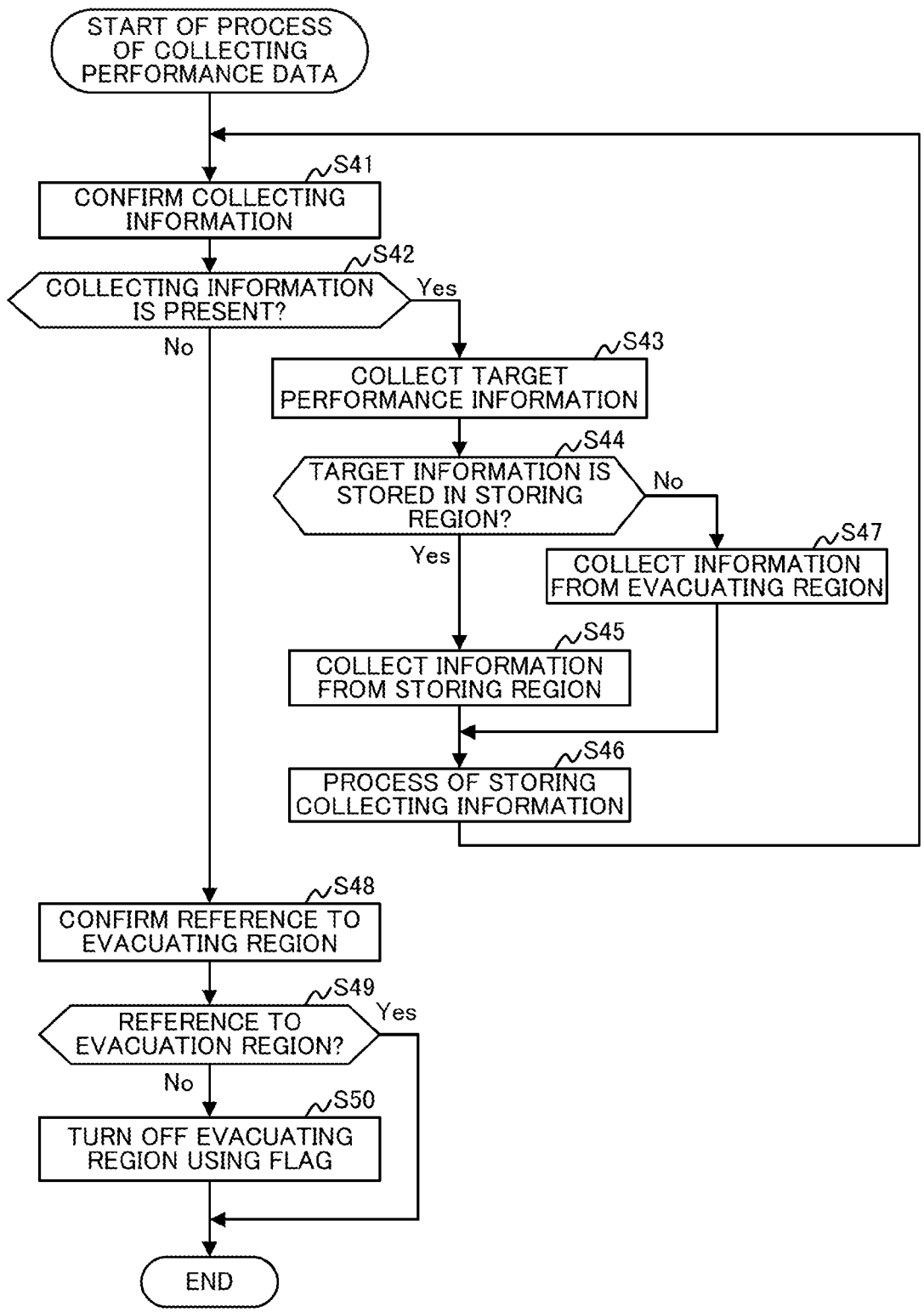
FIG. 11 is a flow diagram illustrating an example of an operation of a process of storing collecting performance data according to the embodiment.

As illustrated in FIG. 11, the collector 22c of the controller device 2 confirms the information (collecting information) assigned to be the collecting target by the collecting request (Step S41), and determines whether or not the collecting information is present (Step S42). In cases where the collecting information is present (Yes in Step S42), the collector 22c collects the collecting information (Step S43).

Here, the collecting information is sometimes stored in the evacuating region 21c by a process of evacuating to be detailed below. For the above, the collector 22c determines whether or not the storing destination of the collecting information is stored in the storing region 21a or 21b (collection-side storing region) by referring to the evacuating region table 24d (Step S44).

In cases where the information element of the collecting information is stored in the collection-side storing region (Yes in Step S44), the collector 22c collects the information element (Step S45) from the collection-side storing region (Step S45), and responds to the system operation server 4 through the communicator 23 with the collected information element.

Then the manager 22e of the controller device 2 executes a process of storing the collecting information (Step S46) and the process moves to step S41. For example, the collector 22c may determine whether or not collecting information that is assigned by the collecting request in Step S41 to which the process moves but that is not collected yet is present.

In contrast, in cases where the information element of the collecting information is stored in the evacuating region 21c (No in Step S44), the collector 22c collects the information element from the evacuating region 21c (Step S47), and responds to the system operation server 4 through the communicator 23 with the collected information element. After that, the process moves to step S46.

In cases where the collecting information is not present in the Step S42 (No in Step S42), the collector 22c confirms reference to the evacuating region 21c by referring to the evacuating region table 24d (Step S48) to confirm whether or not the evacuating region 21c is referred (Step S49), for example.

In cases where the evacuating region 21c is referred (Yes in Step S49), the process is terminated because, for example, collecting information referred by another collecting pattern is present in the evacuating region 21c. In contrast, in cases where the evacuating region 21c is not referred (No in Step S49), the collector 22c sets the flag of the information element in the evacuating region table 24d to Off (Step S50), and ends the process.

Here, when reference to the evacuating region 21c is completed, the collector 22c may release (e.g., deletes the information stored in) the evacuating region 21c. Thereby, resource consumed by the evacuating region 21c can be inhibited from increasing.

This means that the collector 22c is an example of a reference controller that deletes unreferred device information from the evacuating region 21c after the system operation server 4 completes the reference to the unreferred device information in the evacuating region 21c.

<<1-3-5>> Process of Storing Collecting Information:

Next, description will now be made in relation to an example of the operation of the process of storing the collecting information executed in Step S46 of FIG. 11 by referring to FIG. 12.

Figure 12:
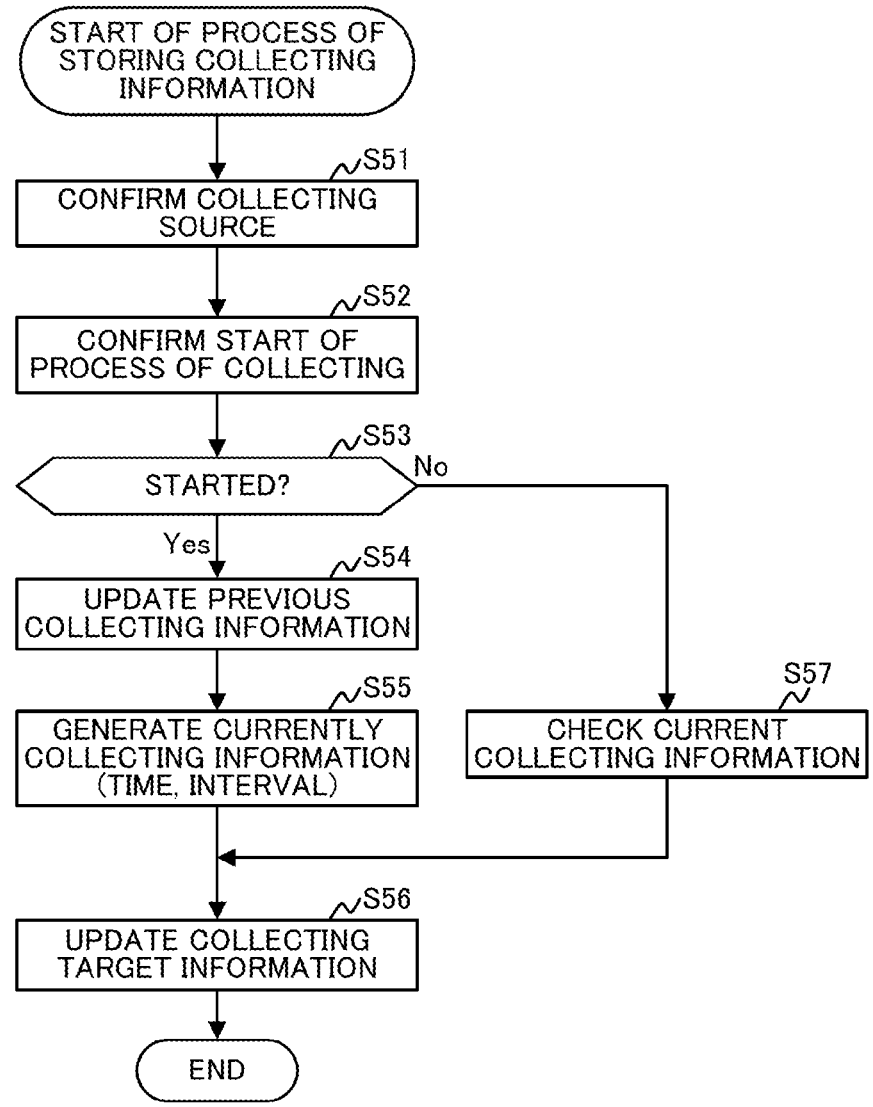
FIG. 12 is a flow diagram illustrating an example of an operation of a process of storing collecting information according to the embodiment.

As illustrated in FIG. 12, the manager 22e of the collecting controller 22 confirms the system operation server SW serving as the collecting source of the performance information (Step S51), and confirms the start of the process of collecting (Step S52) to confirm whether or not the process of collecting is started (Step S53).

In cases where the process of collecting is started (Yes in Step S53), the manager 22e updates the collecting information collected in the previous cycle (Step S54). In cases where the collecting information collected by the collecting source in the previous cycle does not match the current process of collecting, which is exemplified by a new access (collecting pattern) from the collecting source, the manager 22e may generate information for the current cycle (Step S55). For example, the manager 22e may generate a new entry in the management table 24c and set an interval and a latest collecting time in the entry.

After that, the manager 22e updates (e.g., adds) the collecting target information (Step S56) and terminates the process.

In contrast, in cases where the process of collecting is not started (No in Step S53), the manager 22e checks the collecting information to be collected in the current cycle (Step S57), and moves the process to Step S56. In the checking of the collecting information to be collected in the current cycle, the manager 22e may confirm the type (element) of information stored in the collecting information, for example.

<<1-3-6>> Process of Updating Collecting Information:

Next, description will now be made in relation to an example of operation of the process of updating the collecting information executed in Step S54 of FIG. 12 by referring to FIG. 13.

Figure 13:
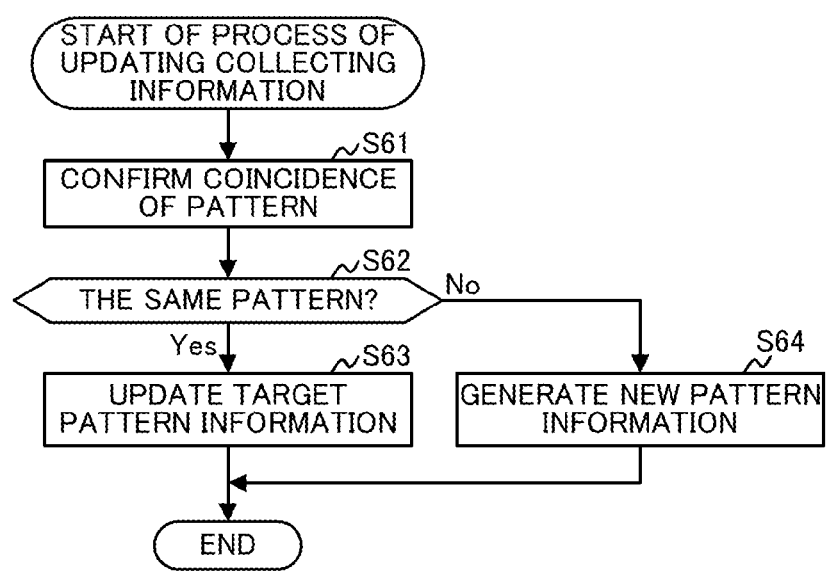
FIG. 13 is a flow diagram illustrating an example of an operation of a process of updating collecting information according to the embodiment.

As illustrated in FIG. 13, the manager 22e compares the type of information included in the collecting information with the collecting pattern of the corresponding collecting source in the collecting pattern table 24b, and confirm the coincidence of the patterns (Step S61) to determine whether the patterns are the same (Step S62).

In cases where the pattern of the collecting information is the same as one of the patterns in the collecting pattern table 24b (Yes in Step S62), the manager 22e updates the information of the target pattern in the evacuating region table 24d (Step S63), and ends the process. An example of updating of the management table 24c is setting of the count and the latest collecting time. If the count in the pattern is two or more, the manager 22e may set a difference between the latest collecting time of the previous cycle and that of the current cycle to be the interval.

As one example, as illustrated in FIG. 14, in cases where information is to be collected on the data pattern corresponding to the pattern No. 1 of collecting pattern table 24b, the manager 22e may add "1" to the count and update the latest collecting time on the entry No. 1 in the management table 24c. The interval may be set to 30, which is the difference between the latest collecting time of the previous cycle and that of the current cycle, but may be omitted if does not changed from the interval of the previous cycle.

In contrast, in cases where the pattern of the collecting information is not the same as one of the patterns in the collecting pattern table 24b (No in Step S62), the manager 22e generates new pattern information (Step S64), and ends the process. An example of generating new pattern information is addition of anew entry to the collecting pattern table 24b and the management table 24c.

As illustrated in FIG. 15, in cases where the pattern of the collecting information is one that collects INFORMATION A, INFORMATION B, and INFORMATION E, which does not exist in the collecting pattern table 24b, the manager 22e may set this collecting pattern to be an entry No. 4 to the management table 24c and set the count to "1" and also set the latest collecting time in the entry.

<<1-3-7>> Process of Evacuating Performance Information:

Next, description will now be made in relation to the process of evacuating performance information executed in Step S15 of FIG. 9 by referring to FIG. 16.

Figure 16:
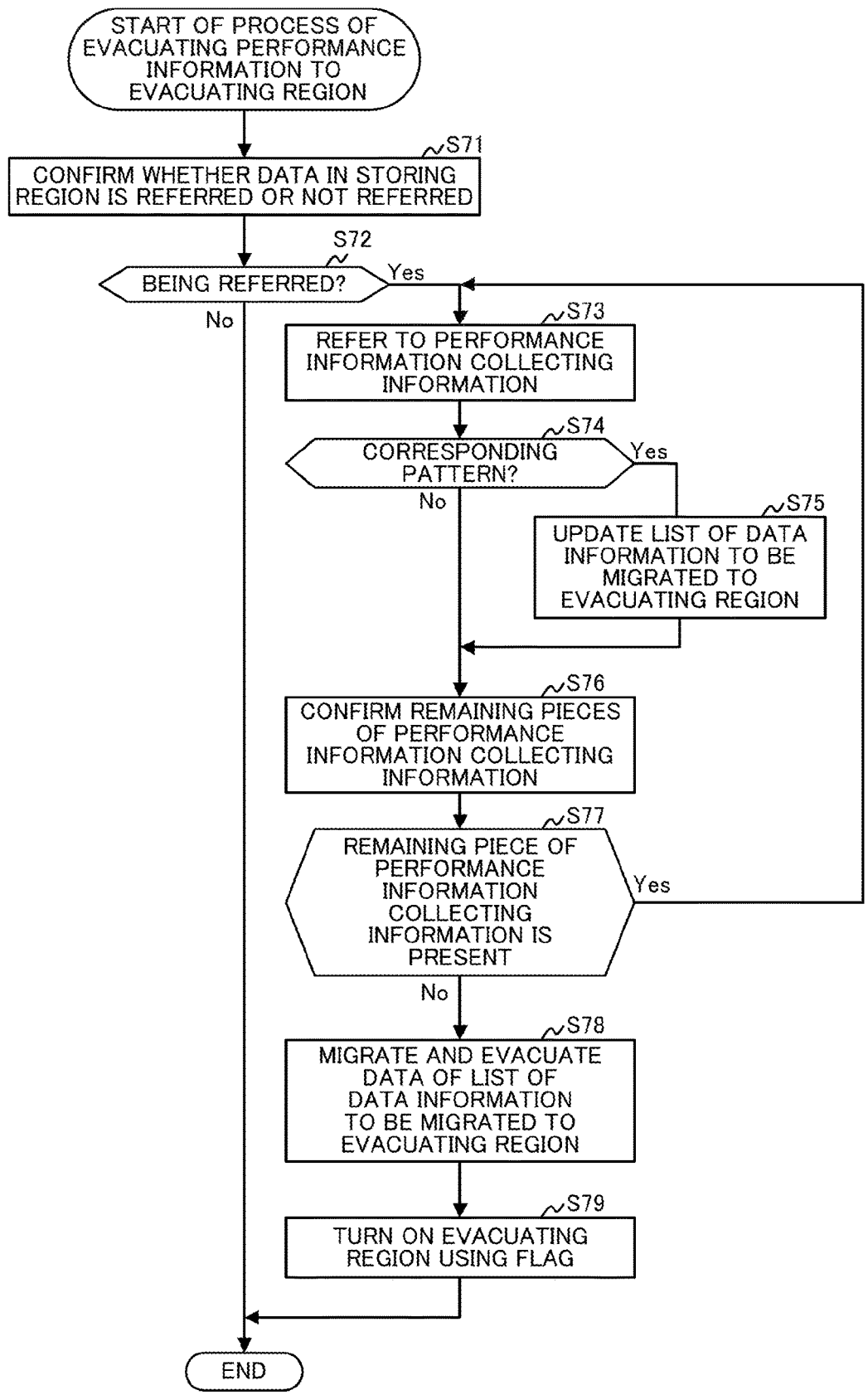
FIG. 16 is a flow diagram illustrating an example of an operation of a process of evacuating performance information to an evacuating region according to the embodiment.

As illustrated in FIG. 16, the updater 22b confirms whether the data stored in the storing regions 21a and 21b is referred or not referred (Step S71) to determine whether data in the storing regions 21a and 21b is being referred (Step S72).

In cases where the data is not being referred (No in Step S72), the process is terminated. In contrast, in cases where the data is being referred (Yes in Step S72), the storing regions 21a and 21b refers to the collecting information of the performance information (Step S73), and determines whether or not the pattern of the collecting information corresponds to any of the existing patterns represented by the collecting pattern table 24b and the management table 24c (Step S74).

The determination of a pattern may include the following steps.

The updater 22b determines whether or not the collecting target coincides with the combination of types of information of any existing pattern by referring to the collecting pattern table 24b.

The updater 22b determines whether or not the timing of the reference access corresponds to the timing of the sum of the latest access timing included in an existing pattern and the execution period (interval) by referring to the management table 24c.

In cases where the results of the both above determinations are positive, the updater 22b may determine that the pattern of the collecting information corresponds to an existing pattern.

In cases where the pattern of the collecting information corresponds to an existing pattern (Yes in Step S74), the updater 22b updates a list of data information to be migrated to the evacuating region 21c (Step S75), and moves to the process to Step S76. For example, the updater 22b may register uncollected information that is not collected yet among the type of information included in the pattern of the collecting information into the list of data information.

In Step S74, in cases where the pattern of the collecting information does not corresponding to any existing pattern (No in Step S74), the updater 22b confirms the remaining pieces of the collecting information of the performance information (Step S76) to determine whether or not the remaining pieces of the collecting information is present (Step S77).

In cases where the remaining pieces of the collecting information is present (Yes in Step S77) likewise a case where the collecting controller 22 receives multiple collecting requests from multiple pieces of the system operation SW, the process moves to step S73.

In contrast, in cases where the remaining pieces of the collecting information is not present (No in Step S77), the updater 22b migrates (evacuates), on the basis of a list of the data information to be migrated to the evacuating region 21c, the information in the list from the storing region 21a or the 21b to the evacuating region 21c (Step S78).

The updater 22b sets a flag of information in the list of the data information on the evacuating region table 24d to "on" (Step S79) and ends the process.

In the above manner, the updater 22b determines the pattern on which the current system operation SW is collecting data on the basis of the collecting pattern table 24b and the management table 24c at the timing of data evacuation of the performance information to the evacuating region 21c. Furthermore, the updater 22b determines the uncollected data by the system operation SW on the basis of the collecting pattern table 24b and the management table 24c, and expands the uncollected data on the evacuating region 21c.

From this point, the updater 22b is an example of a specifier that specifies unreferred device information on the basis of the management information.

For example, a case is assumed which the collecting pattern table 24b and the management table 24c are in the states illustrated in FIG. 17 wherein the system operation SW is collecting data from the storing region 21b (#1) on the pattern No. 1 at the time of 17:40:30 on the day of Aug. 23, 2017.

Figure 18:
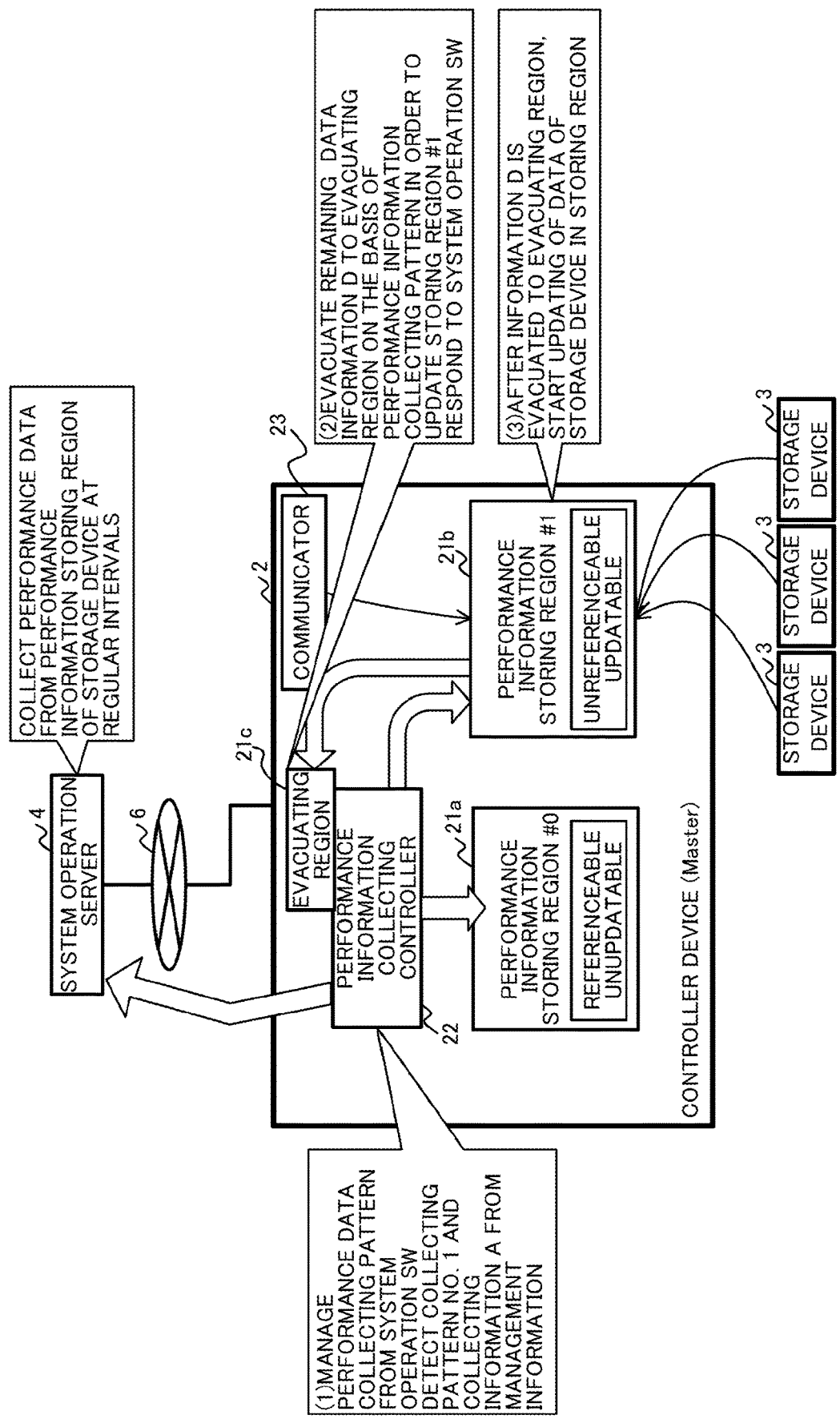
FIG. 18 is a block diagram schematically illustrating an example of an operation of a process of evacuating.

In the case, the updater 22b determines that the data collecting is operating on the pattern No. 1 in the determination of Step S74, and for example, determines that the INFORMATION A is being collected (see the markup (1) in FIG. 18).

In step S75, the updater 22b specifies uncollected data (INFORMATION D) on the basis of the data collecting pattern No. 1 (INFORMATION A and D) and collected data (INFORMATION A), and sets the uncollected INFORMATION D (see FIG. 17) in the list of data information. After that, the manager 22e evacuates the INFORMATION D listed in the list from the storing region 21b to the evacuating region 21c at Step S78 (see the markup (2) of FIG. 18). The evacuated INFORMATION D is responsively sent to the system operation SW from the evacuating region 21c by the collector 22c during the process of collecting (see Step S47 of FIG. 11).

Consequently, after the evacuation of INFORMATION D is completed, the storing region 21b comes to be updatable (switched into the updatable state), so that the updater 22b can execute the process of updating on the storing region 21b (see Steps S18-S20, and the markup (3) of FIG. 18).

As described above, the controller device 2 of this embodiment can unite data collecting by the system operation SW external to the controller device 2 with data collecting by the controller device 2 by controlling the process of updating the performance data in the controller device 2 and the process of collecting performance data by the system operation SW. Thereby, mutual exclusion between collecting and updating of the performance information can be and ensuring consistency of the collecting data can be achieved.

This embodiment can read data of the respective generations by updating the reference updating information 24a and evacuating data to the evacuating region 21c, managing the generations of the storing regions 21a and 21b.

Furthermore, this embodiment determines whether data is required to be evacuated to the evacuating region 21c on the basis of a tendency of a current reference access and limit data to be evacuated to the evacuating region to unreferred data through the management using the collecting pattern table 24b and management table 24c. In addition, upon detection that the process of collecting data from the evacuating region 21c is completed, this embodiment deletes the data evacuated to the evacuating region 21c. As the above, the controller device 2 performs prediction on the basis of the accumulation of tendency of, for example, accesses, in place of or in conjunction with operation depending on an instruction from a superordinate entity such as the system operation SW. Accordingly, a competition of a conflict operations between the superordinate entity and the controller device 2 can be ensured by data evacuation to the evacuating region 21c and region releasing.

<<1-4>> Example of Hardware Configuration

Next, description will now be made in relation to an example of the hardware configuration of the controller device 2 and the system operation server 4 according to this embodiment with reference to FIG. 19. The controller device 2 and the system operation server 4 may have the same hardware configuration, which are exemplified by the computer 20. Hereinafter, an example of the hardware configuration of the computer 20 will now be described.

Figure 19:
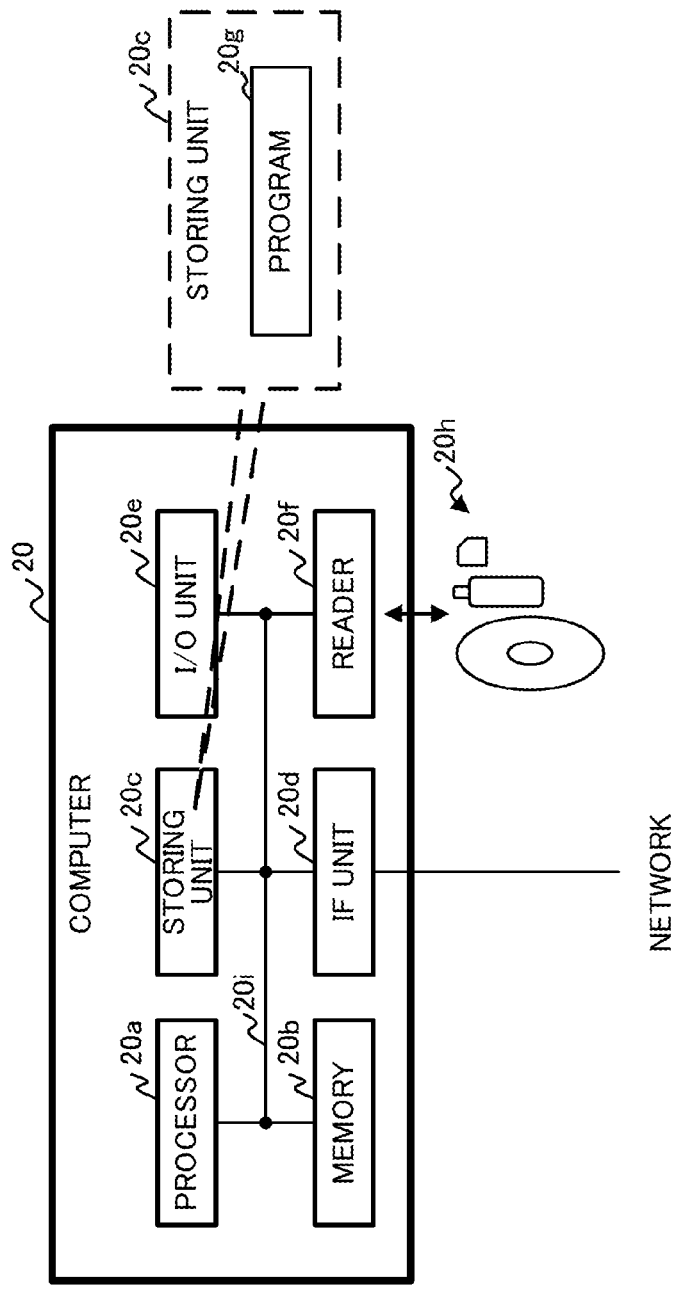
FIG. 19 is a block diagram illustrating an example of the hardware configuration of a computer according to the embodiment.

As illustrated in FIG. 19, a computer 20 exemplarily includes a processor 20a, a memory 20b, a storing unit 20c, an IF unit 20d, an I/O unit 20e, and a reader 20f.

The processor 20a is an example a calculation processing apparatus that executes various controls and calculations. The processor 20a may be bidirectionally-communicably connected to each block in the computer via bus 20i. An examples of the processor 20a is an Integrated Circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA).

The memory 20b is an example of a hardware device that stores information such as various data and programs. An example of the memory 20b is a volatile memory such as a RAM.

The storing unit 20c is an example of a hardware device that stores information such as various data and programs. Examples of the storing unit 20c are storing devices exemplified by a magnetic disk apparatus such as a HDD, a semiconductor drive apparatus such as an SSD, and a non-volatile memory. Example of a non-volatile memory is a flash memory, an SCM, and a ROM.

In the controller device 2, the DB 21 and the memory unit 24 illustrated in FIG. 3 may be each achieved by a storing region of at least one of the memory 20b and the storing unit 20c of the controller device 2. Besides, in the system operation server 4, various pieces of information such as performance information collected from the controller device 2 may be stored in a storing region of at least one of the memory 20b and the storing unit 20c of the system operation server 4.

The storing unit 20c may store a program 20g that achieves all or part of the functions of the computer 20. The processor 20a may achieve the function as the controller device 2 or the system operation server 4 by expanding the program 20g stored in the storing unit 20c into the memory 20b and executing the expanded program 20g.

For example, in the controller device 2, the processor 20a of the controller device 2 can achieve the functions of the collecting controller 22 and the communicator 23 by expanding the program 20g stored in the storing unit 20c and executing a process of calculating. Likewise, in the system operation server 4, the processor 20a of the system operation server 4 can achieve the functions of the system operation SW by expanding the program 20g stored in the storing unit 20c and executing a process of calculating.

The IF unit 20d is an example of a communication IF that controls the connection to and the communication with a network. For example, the IF unit 20d may include an adaptor conforming to a LAN, optical communication (e.g., FC), or an InfiniBand.

For example, the IF unit 20d of the controller device 2 may include a communication IF that controls the connection to and the communication with each of the networks 6 and 7.

The communicator 23 of the controller device 2 may include the communication IF. The IF unit 20d of the system operation server 4 may include a communication IF that controls the connection to and the communication with the network 6.

For example, the program 20g of each of the controller device 2 and the system operation server 4 may be downloaded from the network 6 or 7, or an unillustrated network through the communication IF and stored into the storing unit 20c.

The I/O unit 20e may include one or the both of an input device such as a mouse, a keyboard, or an operation button, and an output device such as a monitor exemplified by a touch panel display or a Liquid Crystal Display (LCD), a projector, or a printer.

The reader 20f is an example of a reader that reads information of data and programs recorded in a recording medium 20h. The reader 20f may include a connection terminal or device that can connect or insert a recording medium 20h thereto. An example of the reader 20f is an adaptor conforming to Universal Serial Bus (USB), a drive unit that accesses to a recording disk, or a card reader that accesses a flash memory such as an SD card. The recording medium 20h may store the program 20g, and the reader 20f may read the program 20g from the recording medium 20h and store the read program 20g into the storing unit 20c.

An example of the recording medium 20h is a non-transitory recording medium such as a magnetic/optical disk or a flash memory. Example of a magnetic/optical disk are a flexible disk, a Compact Disc (CD), a Digital Versatile Disc (DVD), a Blu-ray disk, and a Holographic Versatile Disc (HVD). Examples of a flash memory is a USB memory and an SD card. Examples of a CD are CD-ROM, CD-R, and CD-RW. Examples of a DVD are DVD-ROM, DVD-RAM, DVD-R, DVD-RW, DVD+R, and DVD+RW.

The above hardware configuration of the computer 20 is an example. The hardware elements in the computer 20 may be increased or decreased (addition or deletion of an arbitrary element), divided, or integrated in an arbitrary combination.

One or more of buses may be added or deleted appropriately.

<<2>> Miscellaneous

The technique according to the above embodiment can be changed and modified as follows.

The functions of the collecting controller 22 and the communicator 23 in the controller device 2 may be integrated in an arbitrary combination or may each be divided. The functions of the acceptor 22a, the updater 22b, the collector 22c, and the state setter 22d of the collecting controller 22 of the controller device 2 may be integrated in an arbitrary combination or may each be divided.

The above description is made on assumption that the storage apparatus 1 and the system operation server 4 exemplarily carry out the manner of this embodiment, but this embodiment is not limited to this assumption. Alternatively, the manner according to this embodiment may be applied to monitoring an information processing apparatus exemplified by a server, more specifically, to monitoring an information processing apparatus installed in a data center or an office. In this alternative, a computer such as a user terminal or a monitoring apparatus may be regarded as the system operation server 4, an information processing apparatus such as a server may be regarded as the controller device 2, and various device information collected or stored by the server may be regarded as the performance information.

As one aspect of the manner of the foregoing embodiment, the controller device 2 may be considered to be provided with the following configuration and operation so that the controller device 2, which refers to and updates the performance information of the storage apparatus 1, can refer to correct performance information.

(1) In the storage apparatus 1 in which the system operation SW of the system operation server 4 collects the performance information in order to monitor the performance, the collecting controller 22 is provided to each of the redundant controller devices 2 of the storage apparatus 1.

(2) The collecting controller 22 has the storing regions 21*a* and 21*b* each being capable of storing performance data of two generations and serving as a storing region of collected data of the performance information.

(3) The storing region for the collected data of the performance information can be in a referenceable/unreferenceable state and a updatable/unupdatable state managed by the reference updating information 24*a*.

(4) When receiving an instruction to update the performance data of the storage apparatus (e.g., by a periodic execution trigger), the collecting controller 22 sets one of the two generations being in the unreferenceable state to the updatable state and changes the state of the generation into a referenceable and unupdatable state when the updating of the performance data is finished.

(5) In making one generation in the performance data storing region referenceable, the collecting controller 22 changes the state of the other generation to be unreferenceable.

(6) Upon receipt of an instruction to collect the performance data that the system operation SW issues to the storage apparatus 1, the collecting controller 22 executes the following operations.

(6-1) The collecting controller 22 confirms whether or not a referenceable generation is present in a performance data storing region.

(6-1-A) In cases where a referenceable generation is absent, the collecting controller 22 responds to the system operation SW with waiting for updating.

(6-1-B) In cases where a referenceable generation is present, the collecting controller collects the performance data of the target generation.

(6-2) The collecting controller 22 monitors an operation of collecting the performance data by the system operation SW, confirms the type of data that the system operation SW is collecting and the time of the collecting, and checking whether or not the type of data to be collected is the same type as the data that was collected in the past by comparison.

(6-2-A) If the types are the same, the collecting controller 22 compares the interval of collecting of the current cycle with that of the previous cycle.

(6-2-A-1) If the intervals of collecting are the same, the collecting controller 22 updates the counter (the number of times) of the matched existing pattern in the management table 24*c*.

(6-2-A-2) If the intervals of collecting are different, the collecting controller 22 additionally registers the current pattern as anew data collecting pattern into the collecting pattern table 24*b* and the management table 24*c*.

(6-2-B) If the same information is not present, the collecting controller 22 additionally registers the current pattern as a new data collecting pattern into the collecting pattern table 24*b* and the management table 24*c*.

(7) In cases where updating of the performance data of the storage apparatus 1 is finished while the performance data is collected by the system operation SW, the collecting controller 22 executes the following operations.

(7-1) The collecting controller 22 waits for changing a generation in the unreferenceable state into the referenceable state.

(7-2) The collecting controller 22 waits for ending by monitoring the collecting operation.

(7-2-A) If the updating ended in an allowable range for the next updating of the performance data, the collecting controller 22 switches a generation between the unreferenceable state and the referenceable state.

(7-2-B) If the updating ended beyond the allowable range for the next updating of the performance data, the collecting controller 22 executes the following operation.

(7-2-B-1) The collecting controller 22 determines uncollected data among data that the system operation SW is to collect on the basis of the collecting pattern table 24*b*, and evacuates only the uncollected data to the evacuating region 21*c*. In addition, the collecting controller 22 causes the system operation SW to collect data in the evacuating region 21*c*.

(7-2-B-2) the collecting controller 22 switches a generation between the unreferenceable state and the referenceable state and updates performance data for the next cycle.

According to an aspect of this embodiment, in a controller device that refers to and updates device information can set correct device information to be referenceable.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control apparatus comprising:
  a processor;
  a first storing region and a second storing region that store device information of a monitoring target device; and
  an evacuating region that stores at least part of the device information, wherein
  the processor is configured to execute a procedure, the procedure comprising:
  controlling switching between a first state and a second state at a predetermined timing, the first state including the first storing region being in an updatable state representing that the device information stored therein is unable to be referred from a monitoring device and is able to be updated by the monitoring device, and the second storing region being in a referenceable state representing that the device information stored therein is able to be referred by the monitoring device and is unable to be updated by the monitoring device, the second state including the first storing region being in the referenceable state and the second storing region being in the updatable state;

evacuating, in a case where the second storing region is being referred from the monitoring device at a timing when the first state is switched to the second state, unreferred device information which is unreferred from the monitoring device among the device information stored in the second storing region to the evacuating region;

controlling, after completion of evacuation of the unreferred device information to the evacuating region, switching the second storing region from the referenceable state to the updatable state; and controlling, after completion of reference to the unreferred device information in the evacuating region by the monitoring device, switching the first storing region from updatable state to the referenceable state.

2. The control apparatus according to claim 1, further comprising a management region that stores management information representing a reference pattern of a reference access to the device information by the monitoring device, wherein the procedure further comprises specifying, in a case where the second storing region is being referred from the monitoring device at a timing when the first state is switched to the second state, the unreferred device information based on the management information stored in the management region.

3. The control apparatus according to claim 2, wherein the reference pattern includes a combination of types of information to be referred by a reference access in the device information, wherein the procedure further comprises specifying, in a case where a reference target of the reference access being referred by the monitoring device coincides with the combination of types of information included in the reference pattern, the unreferred device information based on the combination coinciding with the reference target.

4. The control apparatus according to claim 2, wherein the reference pattern includes an executing cycle of a reference access and a latest access timing of the reference access; and the procedure further comprises specifying, in a case where a timing of the reference access being referred by the monitoring device corresponds to a timing of a sum of the latest access timing included in the reference pattern and the executing cycle, the unreferred device information based of the reference pattern.

5. The control apparatus according to claim 2, wherein procedure further comprises, in a case where the monitoring device executes a reference access, updating the reference pattern to the management information or adding a new reference pattern to the management information based on a content of the reference access.

6. The control apparatus according to claim 1, wherein procedure further comprises deleting, after the completion of reference to the unreferred device information in the evacuating region by the monitoring device, the unreferred device information from the evacuating region.

7. A non-transitory computer-readable recording medium having stored therein a control program for causing a computer to execute a process comprising:

controlling switching between a first state and a second state at a predetermined timing, the first state including a first storing region that stores device information of a monitoring target device and that is in an updatable state representing that the device information stored therein is unable to be referred from a monitoring device and is able to be updated by the monitoring device, and a second storing region that stores the device information of the monitoring target device and that is in a referenceable state representing that the device information stored therein is able to be referred by the monitoring device and is unable to be updated by the monitoring device, the second state including the first storing region being in the referenceable state and the second storing region being in the updatable state;

evacuating, in a case where the second storing region is being referred from the monitoring device at a timing when the first state is switched to the second state, unreferred device information which is unreferred from the monitoring device among the device information stored in the second storing region to an evacuating region;

controlling, after completion of evacuation of the unreferred device information to the evacuating region, switching the second storing region from the referenceable state to the updatable state; and controlling, after completion of reference to the unreferred device information in the evacuating region by the monitoring device, switching the first storing region from updatable state to the referenceable state.

8. The non-transitory computer-readable recording medium according to claim 7, the process further comprising:

specifying, in a case where the second storing region is being referred from the monitoring device at a timing when the first state is switched to the second state, the unreferred device information based on management information representing a reference pattern of a reference access of the monitoring device to the device information stored in a management region.

9. The non-transitory computer-readable recording medium according to claim 8, wherein:

the reference pattern includes a combination of types of information to be referred by a reference access in the device information; and the process further comprises specifying, in a case where a reference target of the reference access being referred by the monitoring device coincides with the combination of types of information included in the reference pattern, the unreferred device information based on the combination coinciding with the reference target.

10. The non-transitory computer-readable recording medium according to claim 8, wherein:

the reference pattern includes an executing cycle of a reference access and a latest access timing of the reference access; and the process further comprises specifying, in a case where a timing of the reference access being referred by the monitoring device corresponds to a timing of a sum of the latest access timing included in the reference pattern and the executing cycle, the unreferred device information based of the reference pattern.

11. The non-transitory computer-readable recording medium according to claim 8, the process further comprising, in a case where the monitoring device executes a reference access, updating the reference pattern to the management information or add a new reference pattern to the management information based on a content of the reference access.

12. The non-transitory computer-readable recording medium according to claim 7, the process further comprising:
deleting, after the completion of reference to the unreferred device information in the evacuating region by the monitoring device, the unreferred device information from the evacuating region.

* * * * *